United States Patent [19]

Spencer

[11] Patent Number: 6,154,822

[45] Date of Patent: Nov. 28, 2000

[54] METHOD AND SYSTEM FOR IMPROVING DATA STORAGE AND ACCESS FOR PROGRAMS WRITTEN IN MID-LEVEL PROGRAMMING LANGUAGES

[75] Inventor: Matthew Stephen Spencer, West Pennant Hills, Australia

[73] Assignee: International Business Machines Corporation, Armonk, N.Y.

[21] Appl. No.: 09/063,683

[22] Filed: Apr. 21, 1998

[51] Int. Cl.[7] .................................................. G06F 12/02
[52] U.S. Cl. .......................................................... 711/170
[58] Field of Search ..................................... 711/154, 170

[56] References Cited

U.S. PATENT DOCUMENTS

| | | | |
|---|---|---|---|
| 4,606,002 | 8/1986 | Waisman et al. | 364/200 |
| 5,537,367 | 7/1996 | Lockwood et al. | 367/87 |
| 5,644,709 | 7/1997 | Austin | 395/185.06 |

FOREIGN PATENT DOCUMENTS

WO 97/2754  7/1997  WIPO .

OTHER PUBLICATIONS

Holub, "C+C++: Programming With Objects in C and C++", p. 188–192, 399–403, 1992.
Nielsen (Impact of Emerging Tech. on Computer Science and Ops. pp. 221–243, Netherlands, 1995) Abstract.

*Primary Examiner*—Eddie P. Chan
*Assistant Examiner*—Kevin L. Ellis
*Attorney, Agent, or Firm*—John J. Timar; Felsman, Bradley, Vaden, Gunter & Dillon

[57] ABSTRACT

A method and system, for improving programs which access a memory array, which accomplish their objects via data-processing equipment programmed to do the following: detect a requested memory operation; determine if the requested operation relates to a preexisting memory array; and execute a dynamic memory management module in a fashion dependent upon whether the requested operation relates to a preexisting memory array. When the requested memory operation relates to a preexisting memory array, the dynamic memory management module does the following: identifies the array element upon which the requested operation is to be performed; determines whether the array element upon which the requested operation is to be performed is a bona fide array element; and, if it is determined that the array element is bona fide, allocates memory for the bona fide array element if such has not been done previously, and performs the requested operation upon the bona fide element. Additionally, the dynamic memory management module does the following: examines data stored within an array; determines if that data is sparse; and, if it is determined that the data is sparse, decreases the amount of information from that ordinarily used to represent the data. When the requested memory operation relates to a non-preexisting memory array, the dynamic memory management module does the following: classifies the requested memory operation as an array creation operation if appropriate, and reserves at least one memory address for array storage such that the reservation is less than the size of the array.

13 Claims, 9 Drawing Sheets

METHOD AND SYSTEM FOR IMPROVING DATA STORAGE AND ACCESS FOR PROGRAMS WRITTEN IN MID-LEVEL PROGRAMMING LANGUAGES

BACKGROUND OF THE INVENTION

1. Field of the Invention

The present invention relates, in general, to a method and system for use with data-processing systems utilizing programs. Specifically, the present invention relates to a method and system, for use with data-processing systems utilizing programs written in mid-level programming languages, such as C++, which allow direct control of memory allocation and access. Yet more specifically, the present invention relates to a method and system, for use with data-processing systems utilizing programs written in mid-level programming languages, such as C++, which allow direct control of memory allocation access, where such method and system increase the accuracy, efficiency, and reliability of such programs.

2. Description of Related Art

A data-processing system is composed of one or more computers, peripheral equipment, and software that perform data-processing. A computer is a programmable functional unit: that is typically controlled by internally stored programs, and uses common storage for all or a part of such programs and for all or part of the data necessary for the execution of such programs; executes user-written or user-designated programs; performs user-designated data manipulation, including arithmetic operations and logic operations; and can execute programs that modify themselves during their execution. A digital computer operates on discrete data represented as strings of binary digits. Furthermore, a computer may be a stand-alone unit or may consist of several connected units. A program consists of a sequence of instructions suitable for processing by a computer, wherein such processing may include the use of an assembler, a compiler, an interpreter, or a translator to prepare the program for execution, as well as to execute it.

The program is written in a programming language. A programming language is any artificial language that can be used to define a sequence of instructions that can ultimately be processed and executed by a computer. However, defining what is or is not a programming language can be problematic, but general usage implies that the programming language requires a translation process, such as from a source code expressed using the programming language to a machine code that a computer, or data-processing system, needs to work with, by means of another program, such as a compiler. Thus, English and other natural languages are typically ruled out, although some subsets of English are used and understood by some fourth generation (i.e., artificial intelligence oriented) languages.

There are many different types of programming languages. Programming languages are typically viewed as belonging to one of three different conceptual classes: a low-level language class, a high-level language class, or a mid-level language class.

In a computer, the instructions contained within a program are interpreted and carried out by a processing unit such as a central processing unit. A processing unit is composed of one or more integrated circuits that process coded instructions and perform a task. The set of possible coded instructions for the central processing unit is called its instruction set. The processing and execution of instructions contained within a program are typically represented in machine language which is generated from one or more of the following: interpreter, assembler, compiler, linker. The most prevalent example of a low-level programming language is assembly language. Whereas machine language is coding that is machine specific, assembly language is a mnemonic representation of machine language intended to be more easily understandable by humans and which is (theoretically) machine independent and thus more portable; typically, assembly language is translated, or converted, to the machine language appropriate to a particular processor by an intermediary, machine-specific, computer program known as an assembler.

Human programmers do not think or reason in terms of logical 1 and logical 0, consequently, human programmers often find it exceedingly difficult to program utilizing assembly language. Instead, human programmers tend to think or reason in terms of natural (i.e., human) language or combination of natural and mathematical language. In light of this realization high-level programming languages have been created.

A high-level programming language is a programming language whose concepts and structures are convenient for human reasoning, such as the following: COBOL (common business-oriented language) which is a high-level programming language, based on English, that is used primarily for business applications; FORTRAN (formula translation) which is a high-level programming language based on English and mathematical language, primarily designed for applications involving numeric computations such as scientific, engineering, and mathematical applications; and Pascal, a high-level general-purpose programming language based on English and mathematical language. A high-level programming language allows a human programmer to write instructions for a computer in a way which is much more analogous to human reasoning than is possible with a low-level programming language (such as assembly language). This is accomplished by employing multiple layers of translation programs which successively transform a program written in a high-level programming language into an equivalent set of machine language instructions which a processing unit can understand and execute.

While high-level programming languages relieve the human programmer from the burden of dealing directly with assembly or machine code, there is a cost associated with such relief: with a high-level programming language a human programmer is no longer able to directly access the true logical structure of the processor in use. That is, due to the fact that the machine code equivalent of the programmer's program written in high-level language is produced via multiple layers of translation programs, the programmer is effectively "screened off" from accessing the true logical structure of the processor directly. Ordinarily, such "screening off" does not pose a problem; however, there are instances, such as programs which are very memory and computationally intensive (e.g., voice recognition programs) wherein the programmer would find it very advantageous to be able to create, access, control, and adjust certain processor and/or memory locations directly. On the other hand, even in such situations the programmer does not desire to return to the tedium and lack of ease-of-use associated with assembly/machine language.

Mid-level programming languages have been created to fill the gap between low-level and high-level programming languages. That is, mid-level programming languages have the "look and feel" of high-level programming languages in that they appear and read in a fashion more similar to ordinary human reasoning than low-level programming languages. However, mid-level programming languages are different from high-level programming languages in that they allow the relatively direct access to and manipulation of logical structures within the purview of the processing unit. This makes mid-level programming languages both powerful and dangerous from a programming perspective.

The mid-level programming languages are powerful in that they allow direct access to and control of logical structures (e.g., memory addresses) thereby allowing a programmer to make more efficient use of computational resources. However, such mid-level programming languages are dangerous in that they will allow a programmer to engage in logical mistakes without returning an error message such as would be returned by a high-level language when the same mistake was made. Furthermore, the "compromise" nature gives rise to several unique dangers and inefficiencies associated with such mid-level programming languages.

Two good examples of mid-level programming languages are C and C++. C is a programming language considered by many to be more a machine-independent assembly language than a high-level language (and hence its characterization here as a "mid-level" language) which has the mid-level features discussed above. C++ is an object-oriented version of the C programming language which also contains the mid-level features discussed above. As used herein, the term "C" is intended to refer to both C and its C++ incarnation. C can be utilized to illustrate concrete examples of the foregoing described possible logical mistakes, unique dangers, and inefficiencies associated with mid-level programming languages.

One particular area in which C can be utilized to illustrate the foregoing described possible logical mistakes, unique dangers, and inefficiencies associated with mid-level programming languages is that related to the way C handles arrays.

C allows the programmer to specify an array of a defined specific size (e.g., an array with ten rows and six columns), which results in the reservation of memory sufficient to contain the array. However, due to its built-in power, C will also allow the programmer to attempt to specify and access an element of the array supposedly in the seventh row and tenth column of the array. Such an element is clearly outside of the defined parameters of the array. In a high-level language, such an attempt to access a nonexistent array element would result in an immediate error message; however, in C no error message will be generated and in fact data may be returned in response to the attempt to access such spurious array element. Thus, it is apparent that C will allow the programmer to engage in logical errors in which he would not be able to engage in a high-level programming language.

C allows a programmer to size arrays dynamically, but only for arrays with one dimension; that is, array sizes cannot be set dynamically for arrays having more than one dimension. Consequently, when the size of an array of dimension two or higher depends upon a value calculated at initial run-time, the only option is to allocate more memory than is expected to be needed by the array of dimension two or higher. Such reservation can obviously give rise to programming inefficiencies in the event that the reserved space is not needed.

C stores data in arrays without compression. Consequently, if an array is a multidimensional array and the data being stored in the array is relatively sparse (meaning that there are relatively few nonzero data elements), storing the data is inefficient since most of the data stored in the array has relatively little information content. Furthermore, if the array in question is multidimensional (i.e., two-dimensional or higher) such inefficiencies are exacerbated.

As has been noted, C stores data in arrays without compression. Furthermore, the data stored within the arrays is usually based upon the standard number of bits utilized to represent either a number (e.g., a 32-bit integer) or character (e.g., an 8-bit character). If the arrays contain data which is limited in a range, for example a multidimensional array of flags wherein the flags are restricted to the values zero and one, then it is very inefficient to use such standard number of bits ordinarily utilized to represent either a number or character for this purpose.

In light of the foregoing it is apparent that a need exists for a method and system, for use with mid-level programming languages such as C and C++ which will preserve the flexibility of such mid-level programming languages while preventing and/or eliminating the aforementioned logical errors, unique dangers, and inefficiencies arising from the inherent flexibility of such mid-level programming languages.

SUMMARY OF THE INVENTION

It is therefore one object of the present invention to provide a method and system for use with data-processing systems utilizing programs.

It is therefore another object of the present invention to provide a method and system, for use with data-processing systems utilizing programs written in mid-level programming languages, such as C and C++, which allow direct control of memory allocation and access.

It is yet another object of the present invention to provide a method and system, for use with data-processing systems utilizing programs written in mid-level programming languages, such as C and C++, which allow direct control of memory allocation access, where such method and system increase the accuracy, efficiency, and reliability of such programs.

The method and system accomplish their objects via the use of data-processing equipment programmed to do at least the following: detect a requested memory operation; determine if the requested memory operation relates to a preexisting memory array; and execute a dynamic memory management module in a fashion dependent upon whether the requested memory operation relates to a preexisting memory array or not. When the requested memory operation relates to a preexisting memory array, the dynamic memory management module does the following: identifies the array element upon which the requested memory operation is to be performed; determines whether the array element upon which the requested memory operation is to be performed is a bona fide array element; and, if it is determined that the array element is bona fide, allocates memory for the bona fide array element if such has not been done previously, and performs the requested memory operation upon the bona fide element; however, if it is determined that the array element is not bona fide, a message to that effect is generated and sent. Additionally or alternatively, the dynamic memory management module does the following: examines data stored within an array; determines if that data is sparse; and, if it is determined that the data is sparse, decreases the amount of information from that ordinarily used to represent the data. When the requested memory operation relates to a non-preexisting memory array, the dynamic memory management module does the following: classifies the requested memory operation as an array creation, preserves array dimensions and an initial value for array elements, and reserves at least one memory address for array storage such that the reservation is less than the size of the array.

The above, as well as additional objects, features, and advantages of the present invention will become apparent in the following detailed description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

The present invention sets forth an integrated solution to problems encountered when using multi-dimensional arrays in a mid-level programming language such as C++. Several such exemplary problems were set forth above in the introduction; however, several more such problems for which the present invention provides a solution will become apparent in the following detailed description. Those skilled in the art will recognize that many more analogous such problems exist. Furthermore, while several of the following described embodiments of the present invention are made in the context of C++, those skilled in the art will recognize that the invention as described herein will be applicable to the solution of analogous problems encountered in any programming language, and in particular to such problems encountered in the context of any mid-level programming language.

Figure 1:
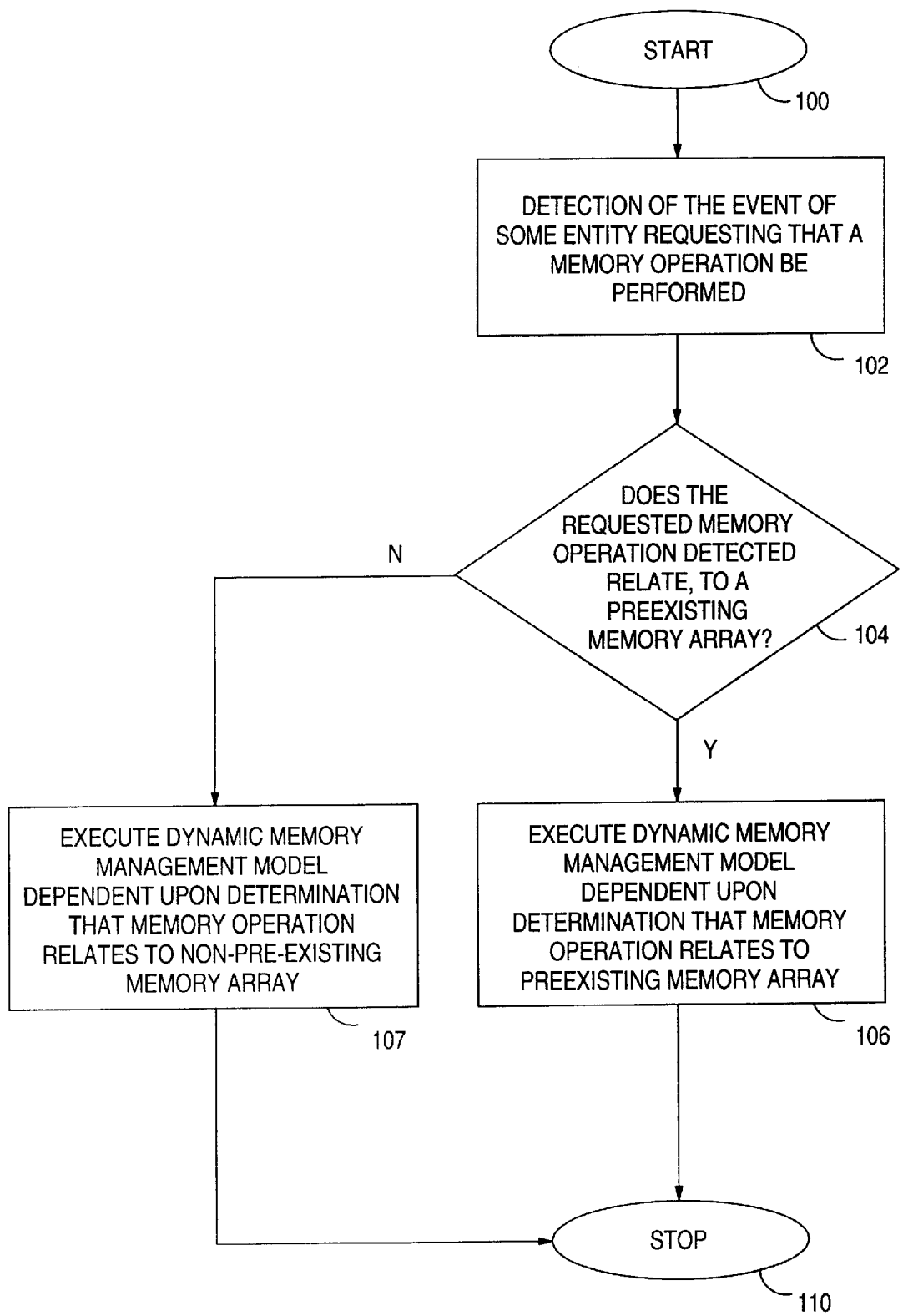
FIG. 1 shows a process for improving programs written in mid-level programming languages in accordance with the present invention.

Refer now to FIG. 1. FIG. 1 shows a process for improving programs written in mid-level programming languages. Method step 100 depicts the start of the process. Method step 102 illustrates the detection of a requested memory operation. The step of detecting can, in general, include the step of emulating at least one standard memory operation of the mid-level programming language, and, in one specific embodiment, includes emulating at least one standard memory operation of the C++ programming language. The requested memory operation usually takes place in the context of obtaining, or setting, the value of a specific element of an array.

Method step 104 shows the determination of whether the requested memory operation detected relates to a preexisting memory array. Method step 106 depicts the execution of a dynamic memory management module in response to the results of the determination as shown in method step 104 indicating that the requested memory operation relates to a preexisting memory array. Method step 107 illustrates the execution of a dynamic memory management module in response to the results of the determination as shown in method step 104 indicating that the requested memory operation does not relate to a preexisting memory operation. The steps engaged in by the dynamic memory management module are dependent upon, and vary with, the results of the determination shown in method step 104, and such various and different steps are illustrated in separate figures in discussions, below. Thereafter, the process proceeds to method step 110 which shows the end of the process.

Figure 2:
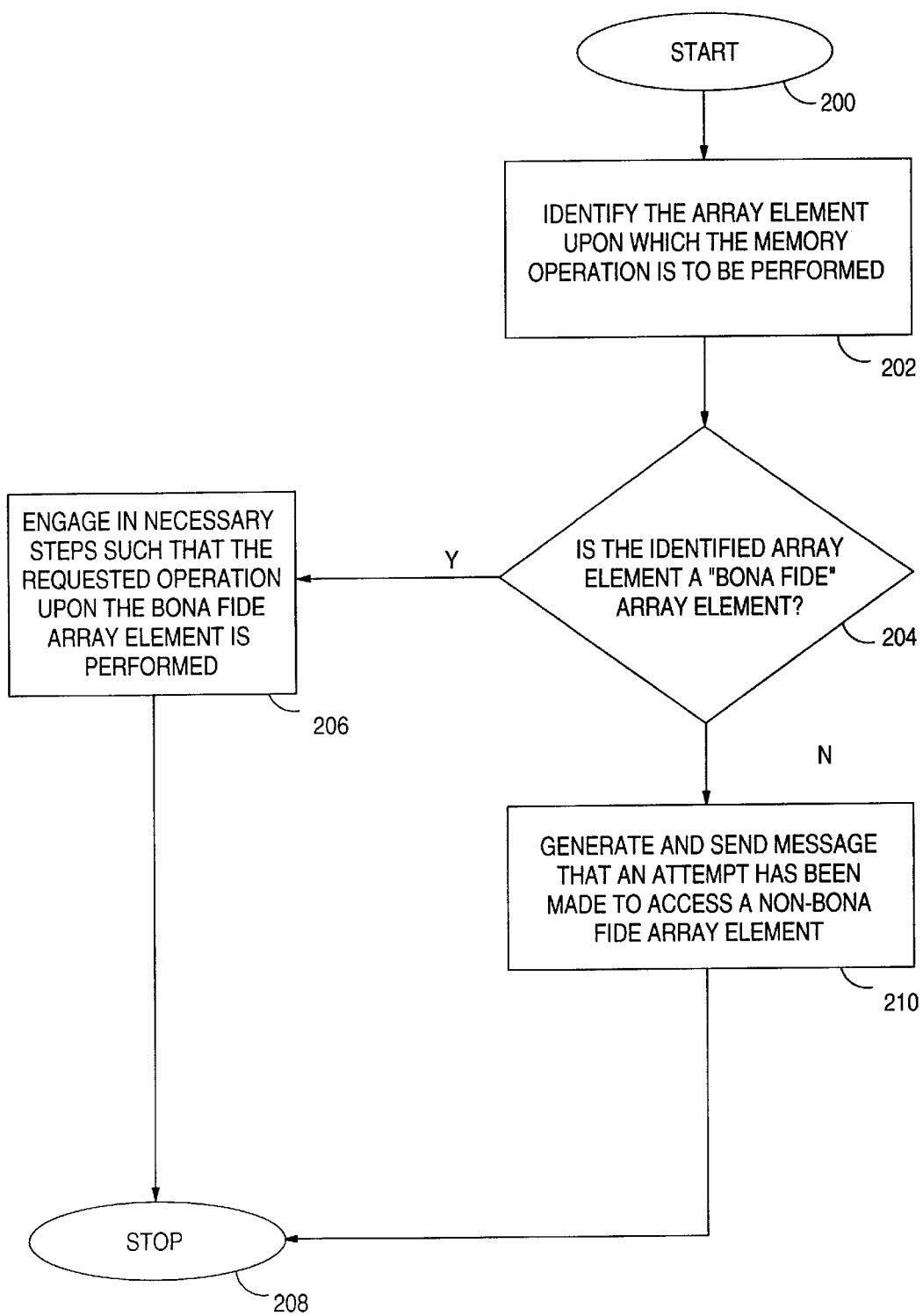
FIG. 2 depicts the flow of the process subsequent to a determination that the requested memory operation detected relates to a preexisting memory array.

Refer now to FIG. 2. FIG. 2 depicts the flow of the process subsequent to a determination that the requested memory operation detected relates to a preexisting memory array. Method step 200 illustrates the start of the process. Method step 202 illustrates the identification of the array element upon which the requested memory operation is to be performed. Method step 204 shows that in response to the identification of the array element upon which the requested memory operation is to be performed, a determination is made as to whether the array element is a "bona fide" array element; the term "bona fide" as used in this context is used to indicate that the identified array element is in fact a "legitimate" array element of the array in question (e.g., is within the defined boundaries of the array).

Method step 206 depicts that in response to a determination that the array element is a bona fide array element, the requested memory operation upon the bona fide element is performed. It is a facet of the present invention to dynamically allocate memory in response to program requirements. Consequently, performing the requested memory operation upon the bona fide element requires a determination of whether memory space has previously been allocated for the bona fide array element as will be shown in FIG. 3, below. Thereafter, the process proceeds to method step 208 which shows the end of the process.

Method step 210 illustrates that in response to determination that the array element is not a bona fide array element a message that an attempt has been made to operate upon a non-bona fide array element is generated and sent. Thereafter, the process proceeds to method step 208 which shows the end of the process.

Figure 3:
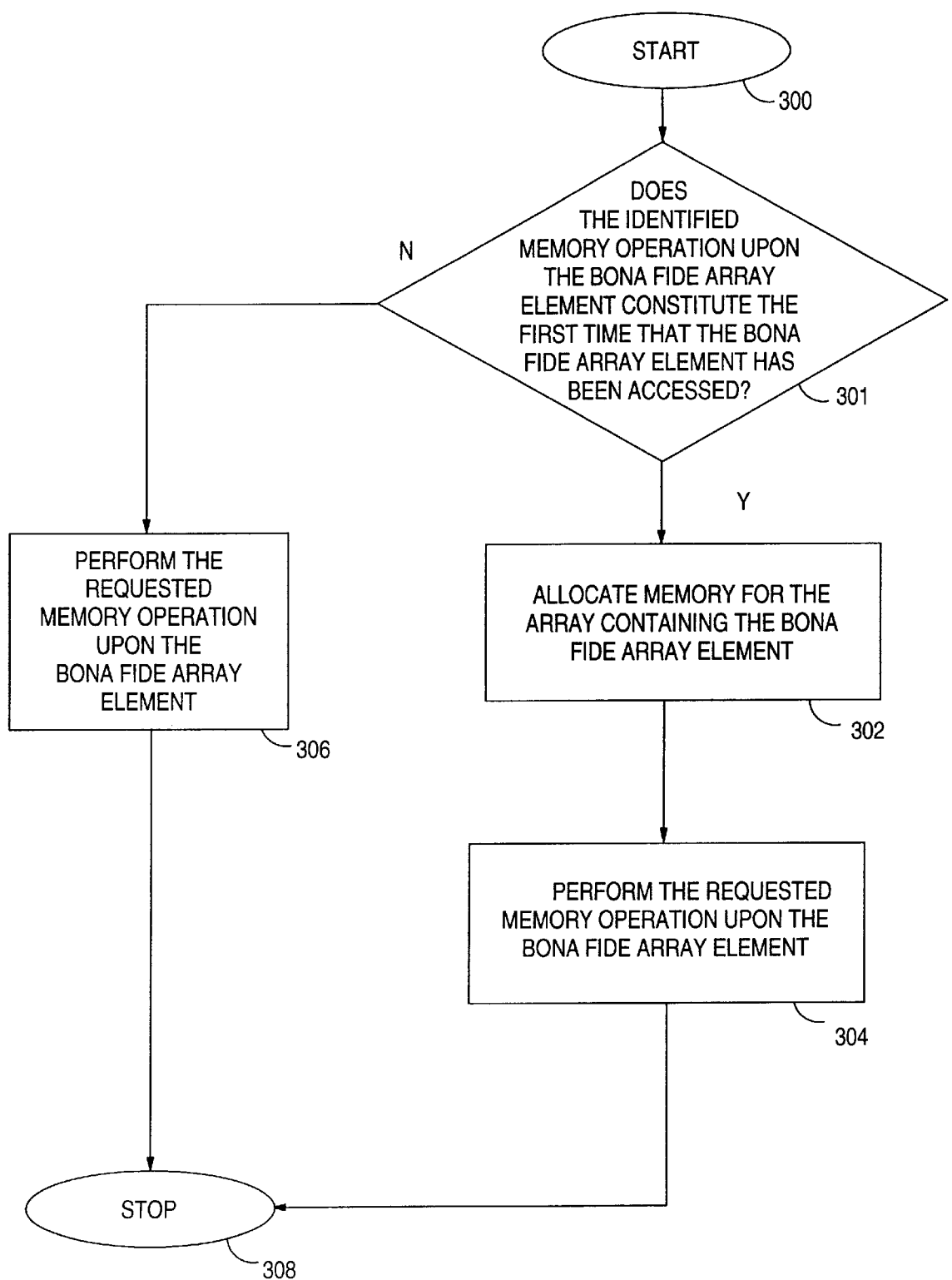
FIG. 3 shows the steps involved, in one embodiment of the present invention, in performing the requested memory operation upon a bona fide array element.

Refer now to FIG. 3. FIG. 3 shows the steps involved, in one embodiment, in performing the requested memory operation upon a bona fide array element. Method step 300 depicts the start of the process. Method step 301 illustrates the determination of whether the requested memory operation constitutes the first time that the bona fide array element has been accessed (e.g., the first time that the bona fide array element is written to). Method step 302 shows that in response to a determination that the requested memory operation is in fact the first accessing of the bona fide array element, memory for the bona fide array element is allocated. Thereafter, method step 304 depicts the performance of the requested memory operation upon the bona fide element. Thereafter, method step 308 shows the end of the process.

Method step 306 illustrates that in the event that the inquiry of method step 301 yielded a determination that the requested memory operation does not constitute a first accessing of the bona fide array element, the requested memory operation is performed upon the bona fide element. Thereafter, method step 308 shows the end of the process.

Figure 4:
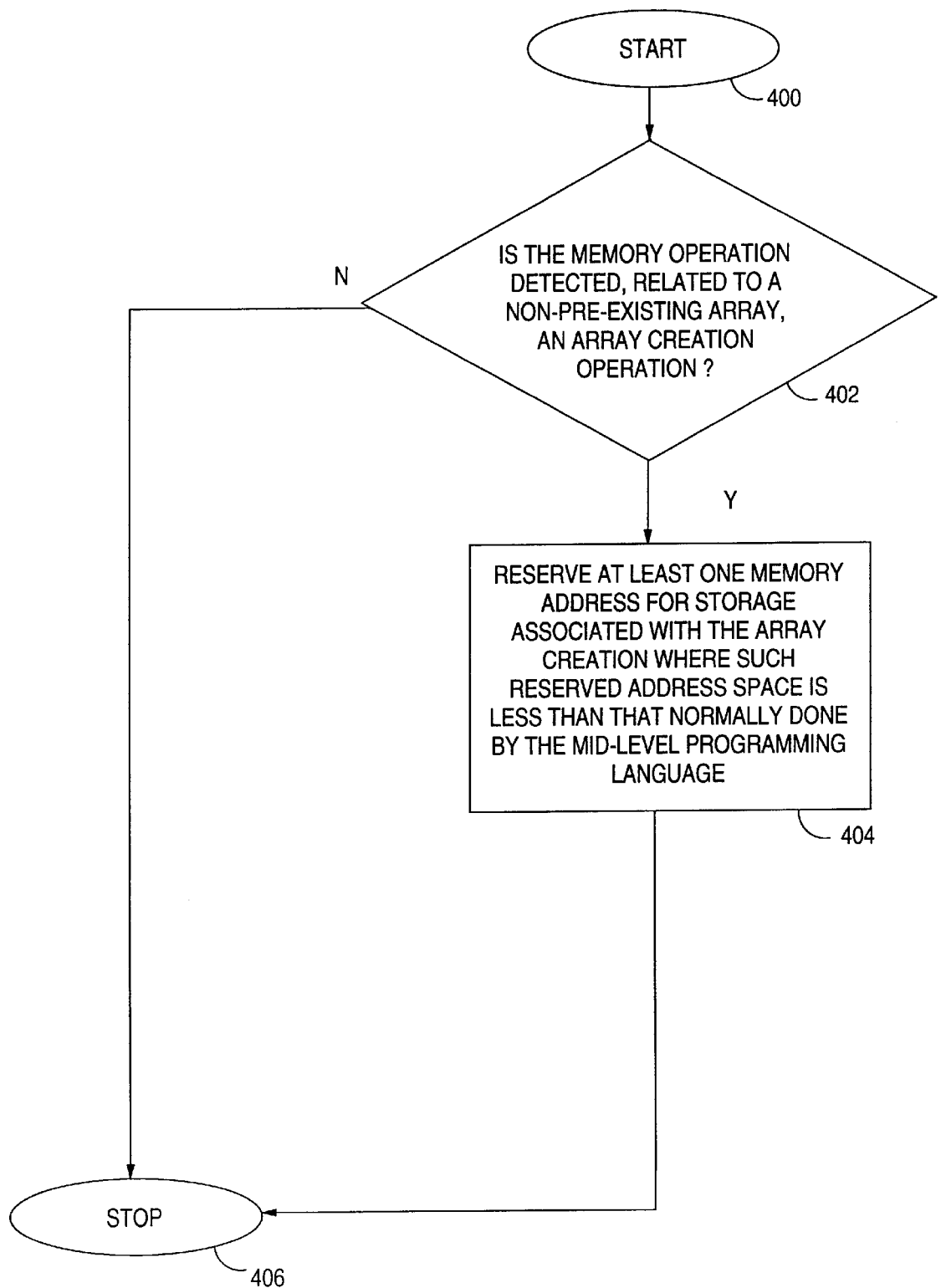
FIG. 4 shows the flow of the process when it is determined that the requested memory operation is not related to a preexisting memory array.

Refer now to FIG. 4. FIG. 4 shows the flow of the process when it is determined that the requested memory operation is not related to a preexisting memory array. Method step 400 depicts the start of the process. Method step 402 illustrates that if the determination illustrated in method step 104 indicated that the memory operation detected was not related to a preexisting memory array, the requested memory operation is classified as being either an array creation operation, wherein array dimensions and an initial value for array elements are preserved, or a non-array creation operation. Method step 404 shows that in response to a determination that the requested memory operation is an array creation operation, wherein array dimensions and an initial value for array elements are preserved, at least one memory address is reserved such that the number of memory addresses reserved is less than that ordinarily reserved by the mid-level programming language. Thereafter, the process proceeds to method step 406 which depicts the end of the process.

If it is determined that the requested memory operation is a non-array creation operation, the process proceeds directly to method step 406 which depicts the end of the process.

Figure 5:
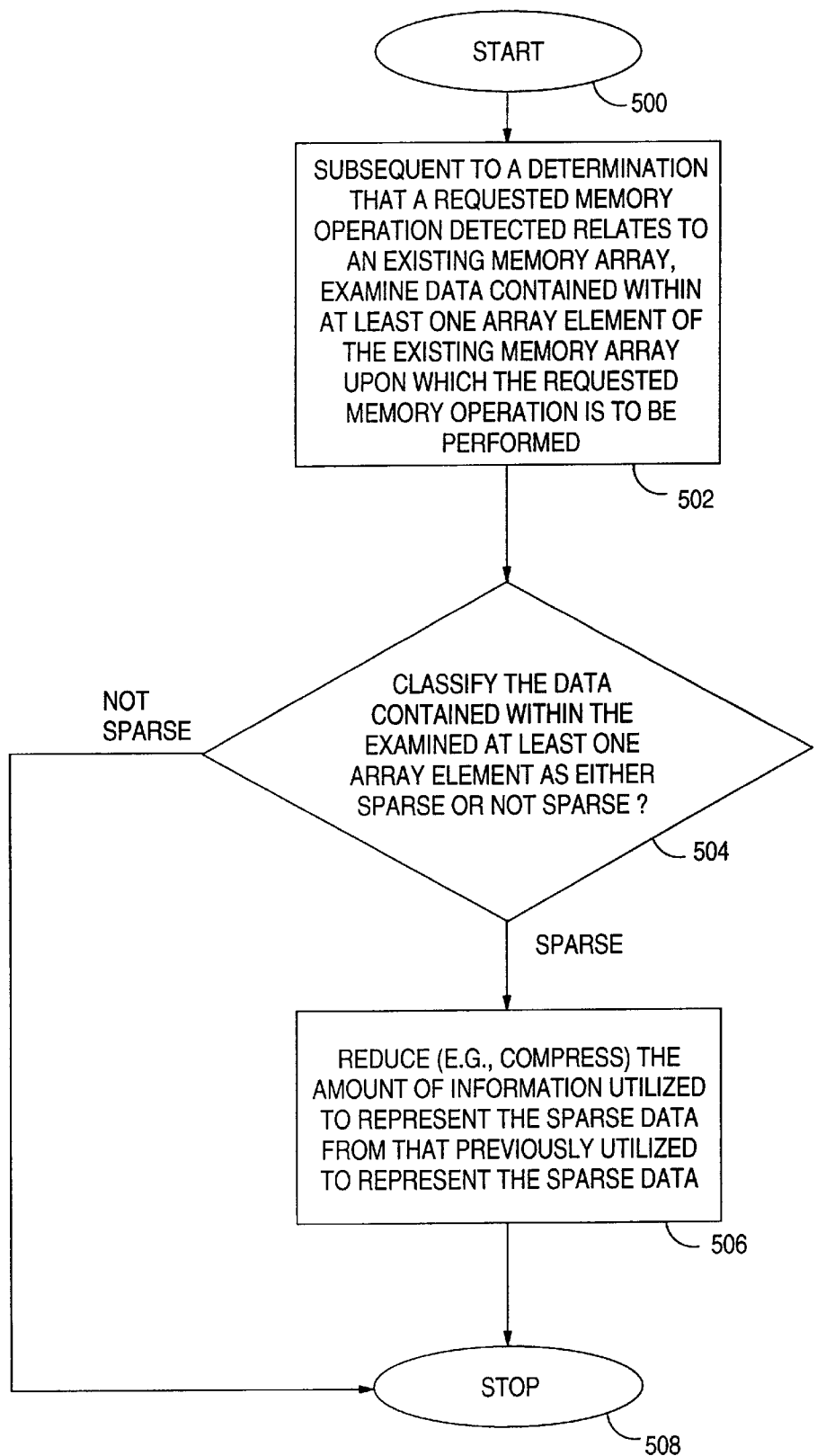
FIG. 5 depicts a second and third embodiment of the present invention as embodied in the flow of the process subsequent to a determination that a requested memory operation detected relates to a preexisting memory array as set forth in the previous figures.

Refer now to FIG. 5. FIG. 5 depicts a second and third embodiment of the present invention as embodied in the flow of the process subsequent to a determination that a requested memory operation detected relates to a preexisting memory array as set forth in the previous figures. FIG. 5 can be viewed as a second embodiment in that it can be treated as a feature additional to the previously described process following a determination that a requested memory operation detected relates to a preexisting memory array; FIG. 5 can be viewed as a third embodiment in that it can be treated as a feature alternative to the previously described process following a determination that a requested memory operation detected relates to a preexisting memory array. Method step 500 illustrates the start of the process. Method step 502 shows that subsequent to determination that the requested memory operation detected relates to a preexisting memory array, all array elements of the preexisting memory array upon which the requested memory operation is to be performed are examined. Method step 504 depicts that in response to the examination, the data contained within the examined array element is classified as either sparse or non-sparse.

Method step 506 illustrates that in response to data being classified as sparse, the amount of information utilized to represent the data classified as sparse is reduced from the amount of information previously utilized to represent the data. Thereafter, the process proceeds to method step 508 which depicts the end of the process.

In the event that the data is not classified as sparse, the process proceeds to method step 508 which depicts the end of the process.

FIGS. 1–5 have discussed an embodiment applicable to any programming language wherein the problems identified in the discussion above may arise. Following is discussed an embodiment of the present invention specifically tailored to the mid-level programming language C++.

Overall Structure of C++ Embodiment

The overall structure of the C++ classes utilized by one embodiment of the invention uses a combination of nested templates and inheritance. A general discussion of templates and inheritance can be found in Breymann & Hughes, *Composite Templates and Inheritance,* Volume 7 C++ Report No. 7 33–40 (September 1995). This embodiment is effected as follows. First, a one-dimensional array (vector) class is constructed, which implements the basic functionality: constructor, destructor, operator[ ], and resize functions; furthermore, the class contains private data members to hold the array parameters and a pointer to the data.

Subsequent to the creation of the one-dimensional array (vector) class, higher dimensions are then created in terms of lower ones in the following fashion: a two-dimensional array is created in terms of a vector of vectors, a three-dimensional array is created in terms of a vector of two-dimensional arrays, and higher dimensional arrays are created in terms of lower dimensional arrays by analogous logical extension. The inheritance approach utilized in the C++ embodiment is such that the operator[ ] function is only implemented at the vector level, and that all bounds-checking and nonzero array base calculations are done in that function.

Constructing the classes as templates gives rise to the functionality such that the arrays can contain objects of any type—from basic data types such as integers ("int" types) or floating point numbers ("float" types), up to complex objects.

Bounds Checking and Non-Zero Base of C++ Embodiment

Each array dimension is described by a minimum and a maximum allowable value. For convenience, the minimum value (the "base" ) is assumed to be the same for all dimensions, but it need not be.

Bounds checking is done in the operator[ ] function. This function takes one argument: the index. The index is tested against both the base and the maximum value for that dimension. If it falls outside the permissible range, a C++ exception is issued (thrown). If not, the index is used to retrieve that element of the array.

As an example of bounds utilized by one embodiment of the invention, an array is used to store water temperature samples (in degrees Fahrenheit) that may have a permissible range of indexes from 32 to 212, inclusive. This is specified by setting base=32, and size=181. Internally, the data array will therefore have internal indexes from 0 to 180, inclusive. A call to operator[ ] with an external index of, say, 200 is mapped to the element at internal index 168 (200−32).

Dynamic Resizing and Array Initialization of C++ Embodiment

The classes utilized by the present embodiment will allow all dimensions of the array to be determined at runtime, which gives increased functionality over standard C++ arrays where all but one dimension must be known at compile-time. The resize() function allocates memory for the data, after freeing the memory which has been previously allocated for the array to be resized. If an initial value for the array elements has been specified, then each element of the array is set to this value.

The resize( ) function is implemented in each subclass, so that a call to the two-dimensional resize( ) function, for example, will in turn resize each of the one-dimensional arrays of which it (the two-dimensional array) is composed.

Note that calling the resize( ) function destroys the existing contents of the array, since it is more desirable to have consistent behavior than to, for example, have the contents preserved if the array is resized to a larger size, but destroyed (or worse, truncated), if the array is reduced in size. If the ability to preserve the data is required, this could be easily done through another function, such as the grow ( ) function, which could ensure that the new size is greater than or equal to the current size in every dimension, and then could copy the data before freeing the previously used memory.

Delayed Memory Allocation of C++ Embodiment

To smooth the allocation of memory within an application (i.e., to spread the requests to allocate memory throughout the execution of the program), the resize( ) function does not actually perform the memory allocation referred to above. Instead, it sets a flag indicating that memory needs to be allocated. The operator[ ] function tests this flag before accessing the data, and if the flag is set, the function first allocates the memory and clears the flag. This approach has the additional benefit that if an array is not accessed at all (which is quite possible, depending on the data), then no memory is allocated for it.

Sparse Data Storage of C++ Embodiment

For the special problem of sparse data storage (large, multidimensional arrays with relatively few nonzero elements), a sparse array class has also been developed. This has the same outward appearance as the other array classes, implementing the same features, but a completely specialized internal structure.

Note that in the description of this class, the expression "nonzero" can be generalized to mean "any value other than the most common value". So, for example, an array which consists mainly of elements set to the value "7", but with occasional elements not equal to the value "7", can equally be considered sparse (as the term "sparse" is used herein), and can also be accommodated by this class.

Also, for purposes of illustration, it is assumed that the sparse array is three-dimensional, but it could have any number of dimensions.

The sparse array class is based on a hash table, whereby nonzero elements are stored in a single-dimensional array, and all "zero" elements are ignored. The hash table requires a key (the index into the one dimensional array), and this is generated by a key-generation function, based on the three (for example) array index values. The key-generation function has the property that any key has an equal probability of being generated and is based Horner's method as set forth by Sedgewick in *Algorithms* 233 (2d ed. 1989). Horner's method in turn requires that the size of the hash table be a prime number, and in one embodiment this is calculated by using the sieve of Eratosthenes as set forth by Sedgewick in *Algorithms* 16 (2d ed. 1989).

Collisions in the hash table (where a combination of array indexes produces a key that is already in use) are resolved by using a "double hashed search" as set forth by Sedgewick in *Algorithms* 239–241 (2d ed. 1989), to find a free location. If no free location can be found, the hash table is considered to be full, and its size is automatically increased. Since the performance of a hash table degrades as it becomes more full, it (the hash table) also is designed to grow in size when it reaches a user-definable percentage of its capacity.

An additional problem which occurs when three-dimensional data is transformed into a one-dimensional space is that one needs to detect whether one is reading from, or writing to, the array. With the regular array classes one embodiment simply returns a reference to the memory location where the data is stored. The calling application then reads from, or writes to, that address. Since the sparse array stores the data in a compressed format, the applications cannot be allowed direct access to the memory location containing the data.

The technique used to distinguish between reads and writes is as described by Meyers in More Effective C++ 217–223 (1996), and is implemented using proxy classes and user-defined assignment operators. When the application writes to the array, the class takes the passed value and its location, hashes and compresses them and stores them in the hash table. Where a read occurred, the class takes the indexes used, calculates the location of the data, retrieves it from the hash table, decompresses it and returns it to the application.

Bit Data Storage of C++ Embodiment

For arrays of data with only two possible values (0 and 1), it is very inefficient to use 32-bit integers to store the value, when only a single bit will suffice. For this case, a "bit array" has also been developed. This is similar to the sparse array in that a multidimensional array is transformed into a one-dimensional array, but in this case the transformation is simpler. Again, a three-dimensional array will be assumed for the purposes of illustration.

The internal array is sized such that each element of the three-dimensional array is represented by 1 bit of the internal one-dimensional array. The size is therefore the product of the three dimensions, divided by 8 (bits per byte). As with a sparse array, reads and writes are distinguished. When writing to the array, the data is checked to enforce that it is one of the permissible values (0 or 1), and an exception is thrown (or generated) if it is not. Then its indexes are transformed to the one-dimensional space, and the appropriate bit in the one-dimensional array is set (for a value of 1), or cleared (for a value of 0). When reading from the array, the indexes are again transformed to the one-dimensional equivalent and the bit is tested. If it is set, then a 1 is returned, if it is clear, a 0 is returned.

Figure 6:
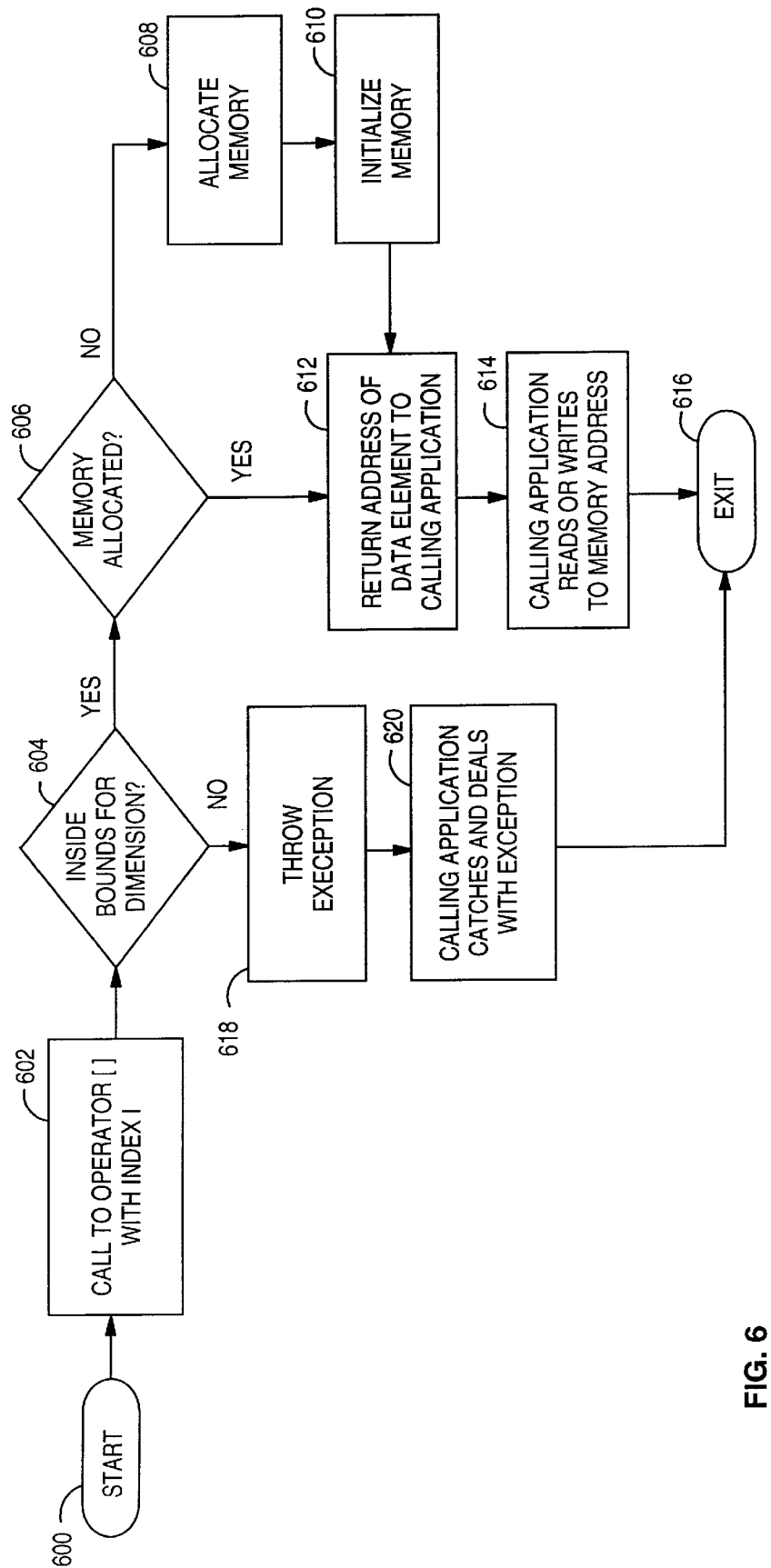
FIG. 6 illustrates a high-level logic flow chart which illustrates a C++ embodiment of the self-checking array data access process of one embodiment of the present invention.

Refer now to FIG. 6. FIG. 6 is a high-level logic flow chart which illustrates a C++ embodiment of the self-checking array data access process of the present invention. Method step 600 shows the start of the process. Method step 602 depicts a call to operator[ ] with an index set to value "I". Method step 604 shows the inquiry of whether index "I" is within the defined dimensional boundaries for the array of which the array element is a member. Method step 606 depicts that if the array element is inside the defined bounds, a determination is made as to whether any memory has previously been allocated for that array element. In the event that no memory has been previously allocated, method step 608 illustrates that memory is allocated. Thereafter, method step 610 shows that memory is initialized. Subsequently, method step 612 depicts that an address for the allocated and initialized memory location is returned to the calling application. Thereafter, method step 614 illustrates that the calling application either reads from or writes to the memory address returned. The process then proceeds to method step 616 which shows the end of the process.

If the determination depicted in method step 606 indicates that memory has previously been allocated for the particular array element in question, the process then proceeds to method step 612 and executes from that point as has been discussed previously.

If the determination depicted in method step 604 indicates that the index of the array element is not within the defined dimensional boundaries for the array of which the array element is a member, method step 618 shows that a C++ exception is thrown. Thereafter, method step 620 depicts that the calling application takes notice of and responds to the exception generated. Subsequently, the process proceeds to method step 616 which shows the end of the process.

Figure 7:
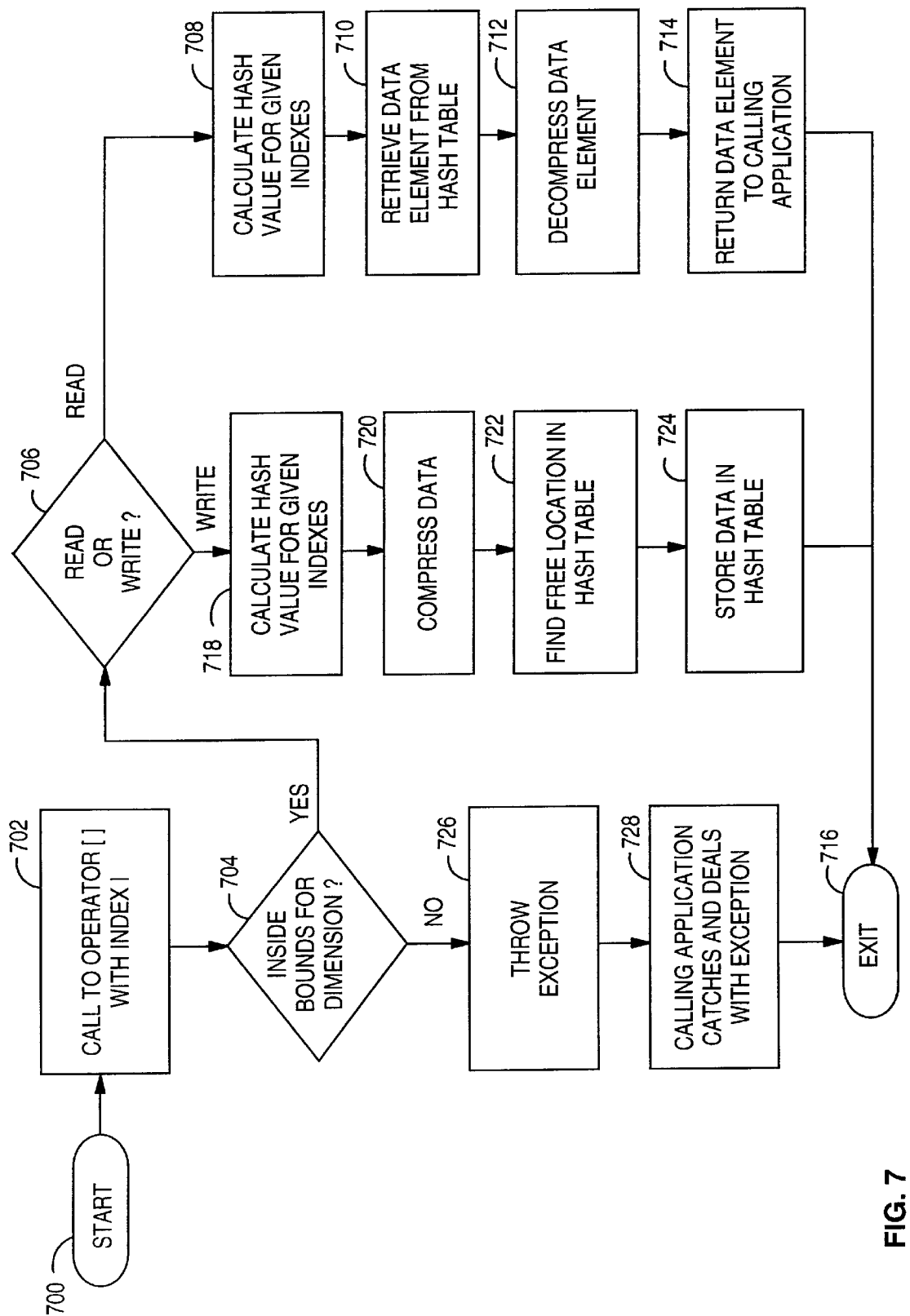
FIG. 7 shows a high-level logic flow chart which illustrates a C++ embodiment of the sparse array data access process of one embodiment of the present invention.

Refer now to FIG. 7. FIG. 7 is a high-level logic flow chart which illustrates a C++ embodiment of the sparse array data access process of the present invention. Method step 700 shows the start the process. Method step 702 depicts a call to operator[ ] with an index set to value "I". Method step 704 shows the inquiry of whether the index of the array element in question is within the defined dimensional boundaries for the array of which the array element is a member. Method step 706 depicts that if the array element is inside defined bounds, a determination is made as to whether the operation to be performed on the particular array element is either a read or a write operation. Method step 708 illustrates that in the event that the operation is a read operation, hash values are calculated for the given indexes. Thereafter, method step 710 shows the retrieval of the data element from the hash table. Method step 712 depicts the decompression of the retrieved data element. Method step 714 illustrates that the decompressed data element is then returned to the calling application. Subsequently, the process proceeds to method step 716 which depicts the end of the process.

If the inquiry depicted in method step 706 results in an indication that the operation in question is a write operation, method step 718 shows that the hash values are calculated for the given indexes. Method step 720 depicts that the data to be written is compressed. Method step 722 illustrates that a free location in the hash table is located. Thereafter, method step 724 shows that the data is stored in hash table. Subsequently, the process proceeds to method step 716 which depicts the end of the process.

If the inquiry depicted in method step 704 results in a determination that the index of the array element in question is outside the defined limits for the array of which the array element is purported to be a part, method step 726 depicts that a C++ exception is thrown, or generated. Thereafter, method step 728 illustrates that the calling application takes notice of the exception generated and takes appropriate action (e.g., notify the user that invalid array element has been accessed). Subsequently, the process proceeds to method step 716 which depicts the end of the process.

Figure 8:
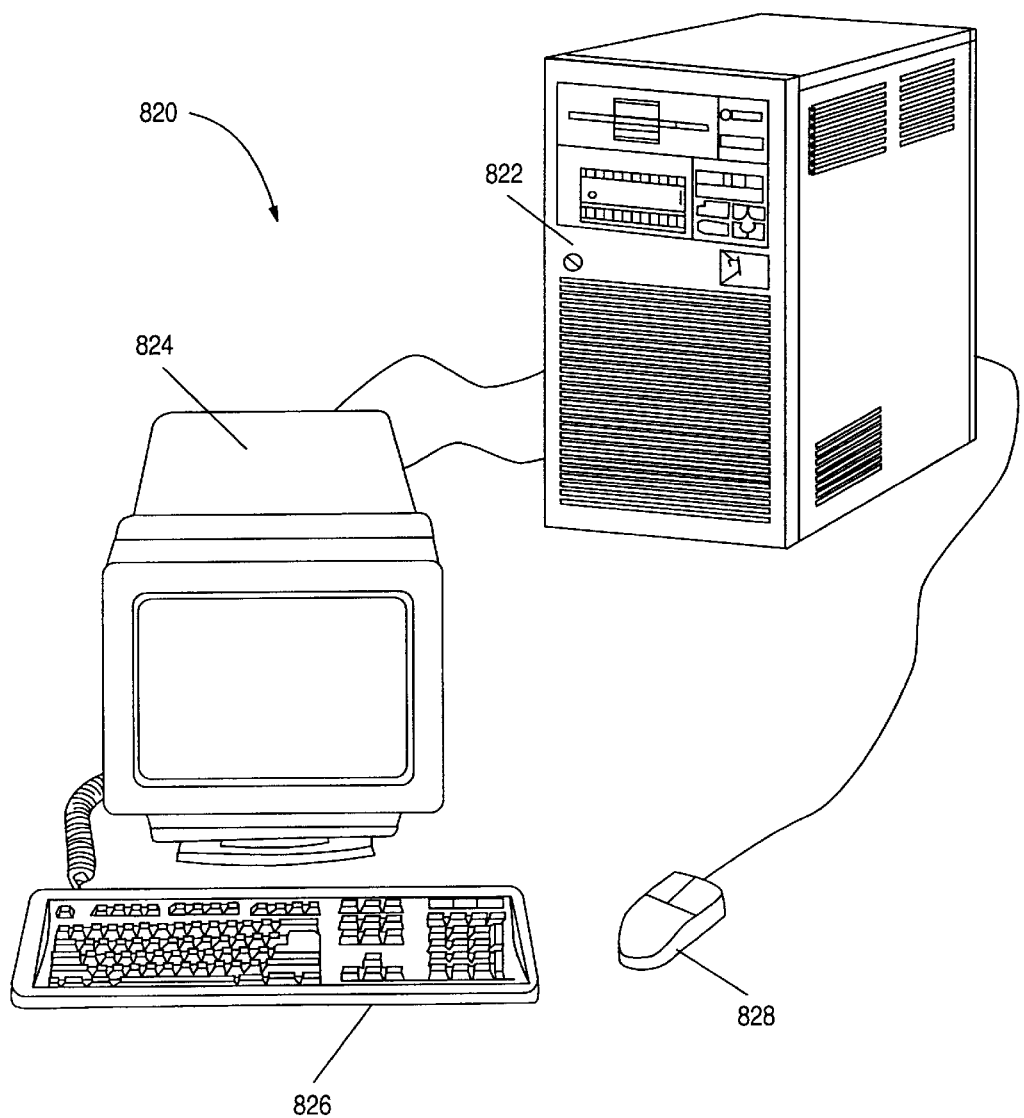
FIG. 8 depicts a pictorial representation of a data-processing system which can be utilized in accordance with the method and system of an illustrative embodiment of the present invention.

With reference now to the figures and in particular with reference now to FIG. 8, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 8. A computer 820 is depicted which includes a system unit 822, a video display terminal 824, a keyboard 826, and a mouse 828. Computer 820 may be implemented utilizing any suitably powerful computer, such as commercially available mainframe computers, minicomputers, or microcomputers.

Figure 9:
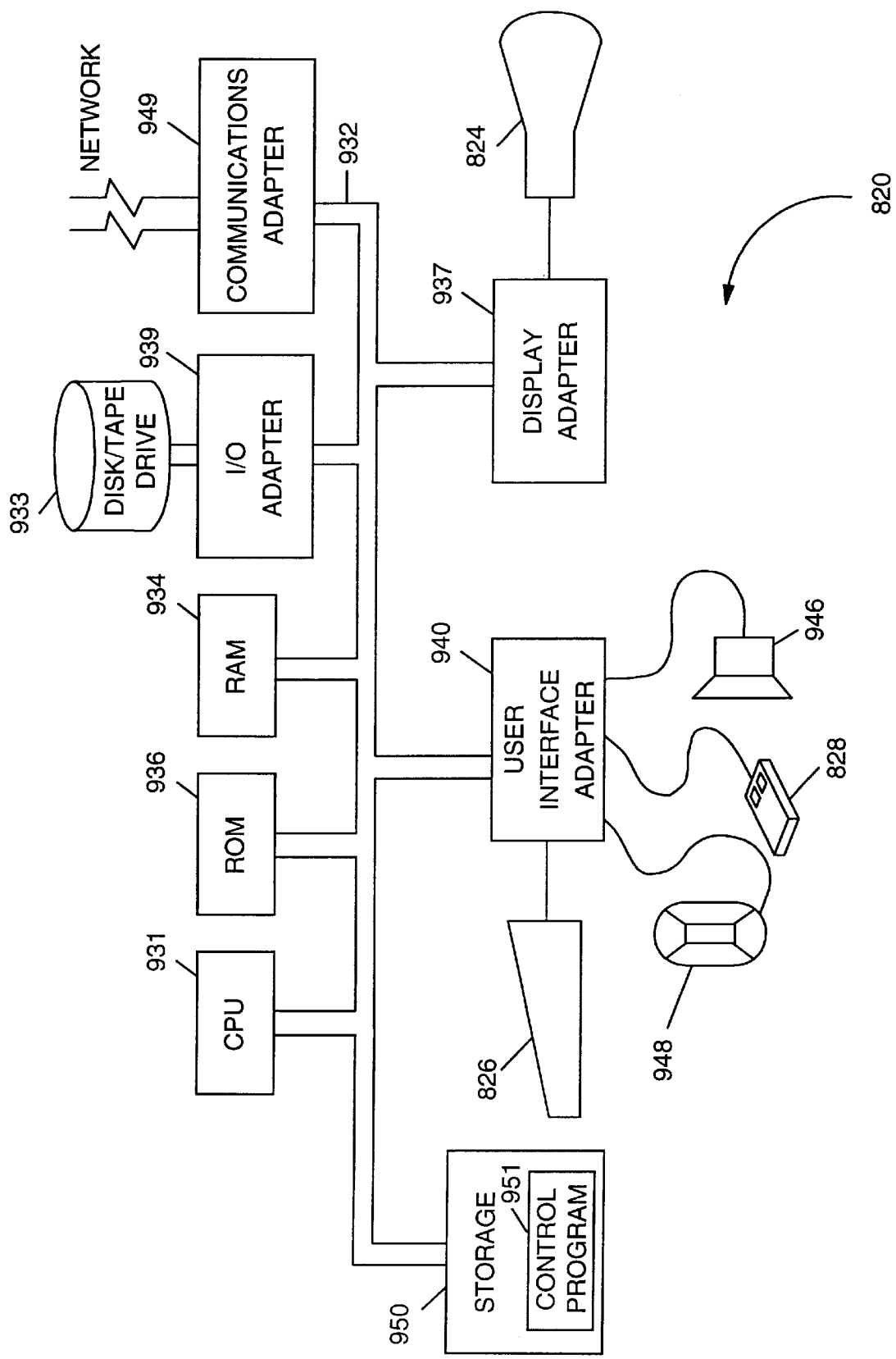
FIG. 9 is an illustration of a representative hardware environment which can be utilized in accordance with the method and system of an illustrative embodiment of the present invention.

FIG. 9 is an illustration of a representative hardware environment which can be utilized in accordance with the method and system of an illustrative embodiment of the present invention. FIG. 9 depicts selected components in computer 820 in which an illustrative embodiment of the present invention may be implemented. System unit 822 includes a Central Processing Unit ("CPU") 931, such as a conventional microprocessor, and a number of other units interconnected via system bus 932. Computer 820 includes random-access memory ("RAM") 934, read-only memory ("ROM") 936, display adapter 937 for connecting system bus 932 to video display terminal 824, and I/O adapter 939 for connecting peripheral devices (e.g., disk and tape drives 933) to system bus 932. Video display terminal 824 is the visual output of computer 820, which can be a CRT-based video display well-known in the art of computer hardware. However, with a portable or notebook-based computer, video display terminal 824 can be replaced with an LCD-based or a gas plasma-based flat-panel display. Computer 820 further includes user interface adapter 940 for connecting keyboard 826, mouse 828, speaker 946, microphone 948, and/or other user interface devices, such as a touch screen device (not shown), to system bus 932. Communications adapter 949 connects computer 820 to a data-processing network.

Any suitable machine-readable media may retain the method and system of an illustrative embodiment of the present invention, such as RAM 934, ROM 936, a magnetic diskette, magnetic tape, or optical disk (the last three being located in disk and tape drives 933). Any suitable operating system and associated graphical user interface (e.g., Microsoft Windows) may direct CPU 931. For example, the AIX operating system and AIXwindows windowing system (i.e., graphical user interface) can direct CPU 931. The AIX operating system is IBM's implementation of the UNIX operating system. UNIX is a trademark of UNIX Systems Laboratories, Inc. The RISC System/6000 system, among others, can run the AIX operating system. Other technologies can also be utilized in conjunction with CPU 931, such as touch-screen technology or human voice control. In addition, computer 820 includes a control program 951 which resides within computer storage 950. Control program 951 contains instructions that when executed on CPU 931 carries out one or more of the operations depicted in the logic flowcharts of FIGS. 1, 2, 3, 4, 5, 6, and 7 or any other illustrative example as described herein.

Those skilled in the art will appreciate that the hardware depicted in FIG. 9 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method for improving programs which access a memory array, said method comprising the steps of:

detecting a requested memory operation;

determining if the requested memory operation relates to an existing memory array; and in response to a determination that the requested memory operation relates to an existing memory array, executing a dynamic memory management module that examines at least one array element of the existing memory array upon which the requested memory operation is to be performed, in response to said examination, classifies at least one datum contained within the at least one array element as either sparse or non-sparse, and in response to said step of classifying, reduces information previously utilized to represent the least one datum which was classified sparse.

2. The method of claim 1, wherein said step of determining determines that the requested memory operation does not relate to an existing memory array, and wherein said step of executing a dynamic memory management module further comprises the steps of:

classifying the requested memory operation as either array creation or non-array creation; and in response to said step of classifying yielding a determination and that the requested memory operation is an array creation operation, reserving at least one memory address and such that the number of memory addresses reserved is less than the size of the array.

3. The method of claim 1, wherein said step of detecting further includes the step of emulating at least one standard memory operation of a mid-level programming language.

4. The method of claim 3, wherein said step of emulating at least one standard memory operation of the mid-level programming language further includes the step of emulating at least one standard memory operation of the C programming language.

5. The method of claim 1, wherein said step of determining determines that the requested memory operation relates to an existing memory array, and wherein said step of executing a dynamic memory management module further comprises the steps of:

identifying the array element upon which the requested memory operation is to be performed;

in response to said step of identifying, determining whether the array element upon which the requested memory operation is to be performed is a bona fide array element; and in response to said step of determining yielding a determination that the array element is a bona fide array element, performing the requested memory operation upon the bona fide element.

6. The method of claim 5, wherein said step of performing the requested memory operation upon the bona fide element further comprises the steps of:

determining whether the requested memory operation is the first accessing of the bona fide array element;

in response to said step of determining yielding a determination that the requested memory operation is the first accessing of the bona fide array element, allocating memory for the bona fide array element, and performing the requested memory operation upon the bona fide element; and in response to said step of determining yielding a determination that the requested memory operation is not the first accessing of the bona fide array element, performing the requested memory operation upon the bona fide element.

7. The method of claim 5, further comprising the step of:

in response to said step of determining yielding a determination that the array element is not a bona fide array element, sending a message that an attempt has been made to operate upon a non-bona fide array element.

8. A system for improving programs which access a memory array, said system comprising:

means for detecting a requested memory operation;

means for determining if the requested memory operation relates to a preexisting memory array; and means, responsive to said means for determining, for executing a dynamic memory management module, wherein said means for executing comprises:

means, responsive to a determination that the requested memory operation relates to an existing memory array, for examining at least one array element of the existing memory array upon which the requested memory operation is to be performed;

means, responsive to said means for examining, for classifying at least one datum contained within the at least one examined array element as either sparse or non-sparse; and means, responsive to said means for classifying, for reducing information previously utilized to represent the least one datum which was classified sparse.

9. The system of claim 8, wherein said means for determining determines that the requested memory operation does not relate to an existing memory array, and wherein said means for executing a dynamic memory management module further comprises:

means for classifying the requested memory operation as either array creation or non-array creation; and means, responsive to said means for classifying yielding a determination and that the requested memory operation is an array creation operation, for reserving at least one memory address and such that the number of memory addresses reserved is less than the size of the array.

10. The system of claim 8, wherein said means for detecting further includes means for emulating at least one standard memory operation of a mid-level programming language.

11. The system of claim 8, wherein said means for determining determines that the requested memory operation relates to an existing memory array, and wherein said means for executing a dynamic memory management module further comprises:

means for identifying the array element upon which the requested memory operation is to be performed;

means, responsive to said means for identifying, for determining whether the array element upon which the requested memory operation is to be performed is a bona fide array element; and means, responsive to said means for determining yielding a determination that the array element is a bona fide array element, for performing the requested memory operation upon the bona fide element.

12. The system of claim 11, wherein said means for performing the requested memory operation upon the bona fide element further comprises:

means for determining whether the requested memory operation is the first accessing of the bona fide array element;

means, responsive to said means for determining yielding a determination that the requested memory operation is the first accessing of the bona fide array element, for allocating memory for the bona fide array element, and for performing the requested memory operation upon the bona fide element; and means, responsive to said means for determining yielding a determination that the requested memory operation is not the first accessing of the bona fide array element, for performing the requested memory operation upon the bona fide element.

13. The system of claim 11, further comprising:

means, responsive to said means for determining yielding a determination that the array element is not a bona fide array element, for sending a message that an attempt has been made to operate upon a non-bona fide array element.

* * * * *